May 20, 1958 M. B. HAYES 2,835,333

FUEL AND AIR TEMPERATURE CONTROL SYSTEM

Filed Jan. 12, 1956 2 Sheets-Sheet 1

INVENTOR

MILES B. HAYES

BY Shoemaker & Mattare

ATTORNEYS

Fig. 2
Fig. 4
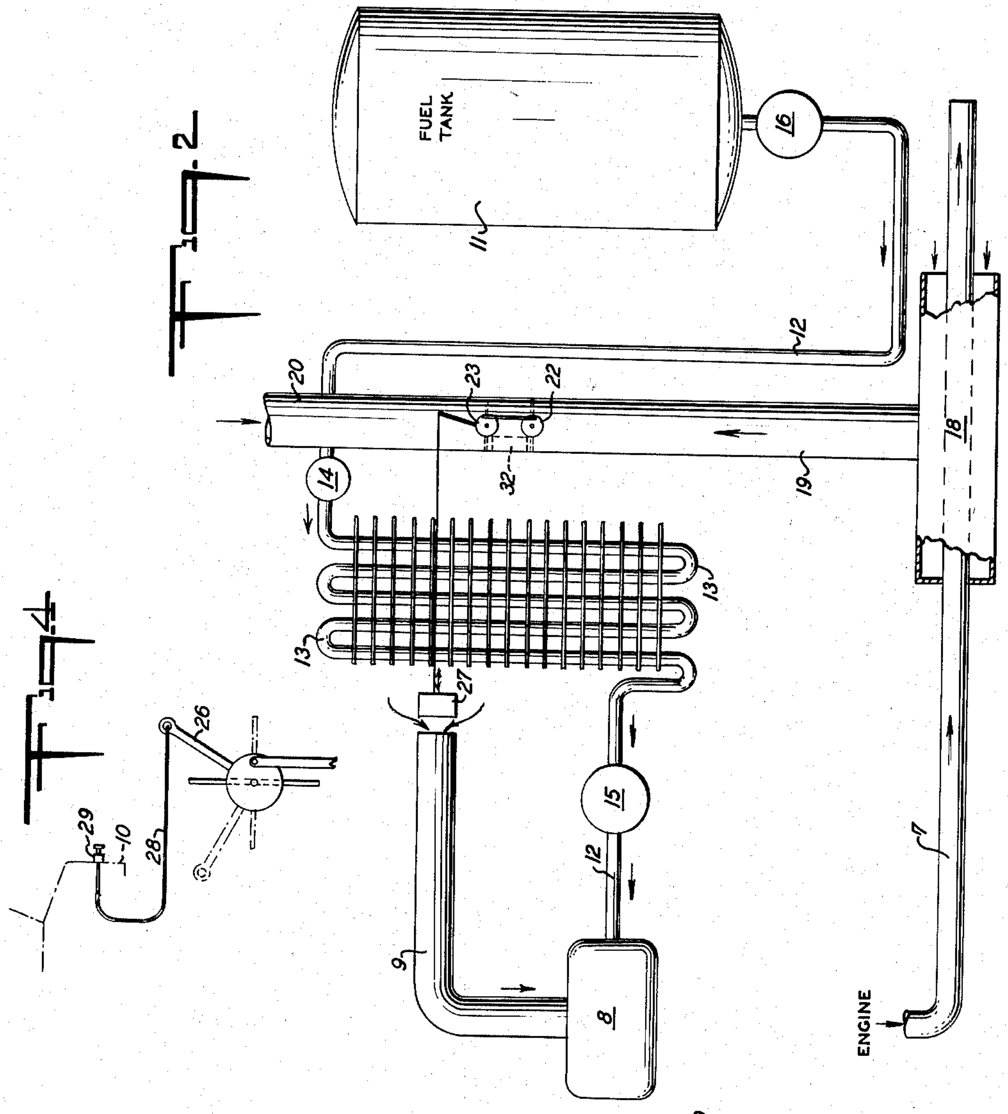
Fig. 3
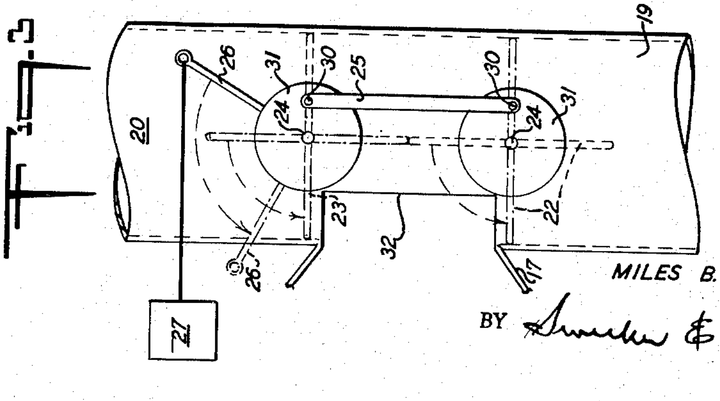
INVENTOR
MILES B. HAYES
BY
ATTORNEYS

United States Patent Office 2,835,333

Patented May 20, 1958

2,835,333

FUEL AND AIR TEMPERATURE CONTROL SYSTEM

Miles B. Hayes, Wichita Falls, Tex.

Application January 12, 1956, Serial No. 558,738

4 Claims. (Cl. 180—54)

This invention relates to improvements in fuel supply systems for motor vehicles and all liquefied petroleum gas engines, and more particularly to vehicles which use liquefied petroleum gas, such as propane, butane and the like.

The use of liquefied petroleum gas as a fuel for engines has long been employed. It has been the practice heretofore to use a heat exchanger for effecting vaporization of the liquefied petroleum gas as it is supplied to the carburetion system of the engine. The heat exchanger results in a cooling condition, due to the absorption therein of latent heat of vaporization from the liquefied petroleum gas, but no satisfactory system has been provided heretofore for utilizing effectively the cooling condition which results from the action of the heat exchanger.

One object of this invention is to take advantage of the cooling action provided by the heat exchanger of a liquefied petroleum gas system for regulating the fuel and air intake temperature of engines using liquefied petroleum gas fuel.

A second object is to utilize said cooling action for cooling the interior of a motor vehicle, cab, etc., and to effect a comfortable operating condition therein.

Another object of the invention is to regulate the supply of fresh air to the interior of the vehicle as well as to the fuel intake system of the engine thereof, so as to effect uniform operating conditions, regardless of temperature conditions outside the vehicle.

A further object of the invention is to circulate fresh air into the body of the vehicle in heat exchange relation with the vaporized liquefied petroleum gas, not only to effect a cooling of the interior of the body, but also to be supplied to the intake fuel system of the engine in uniformity of temperature regulation which will increase the fuel economy and will also result in a uniform operation of the engine.

These objects may be accomplished, according to one embodiment of the invention in which a heat exchanger is provided in a conventional or suitable liquefied petroleum gas fuel supply system for a vehicle engine. Connections are made for supplying air to the heat exchanger either from the outside atmosphere or from a separate source which is heated as a result of the operation of the engine. Valve means regulates the supply of air from the respective sources to the heat exchanger, where it is cooled as it is discharged into the heat exchanger or in heat exchange relation therewith. This air, thus cooled, is then supplied to the intake fuel system of the engine providing a source of air for the latter which is regulated in temperature, and is uniform regardless of outside temperature conditions that may be encountered.

This embodiment of the invention is illustrated in the accompanying drawings, in which:

Fig. 2 is another diagrammatic view illustrating the application of the invention to the fuel supply system;

Fig. 3 is a side elevation of the control valves for the air supply, thermostatically operated; and Fig. 4 is a diagrammatic view illustrating a manual operation of the control valves.

Figure 1:
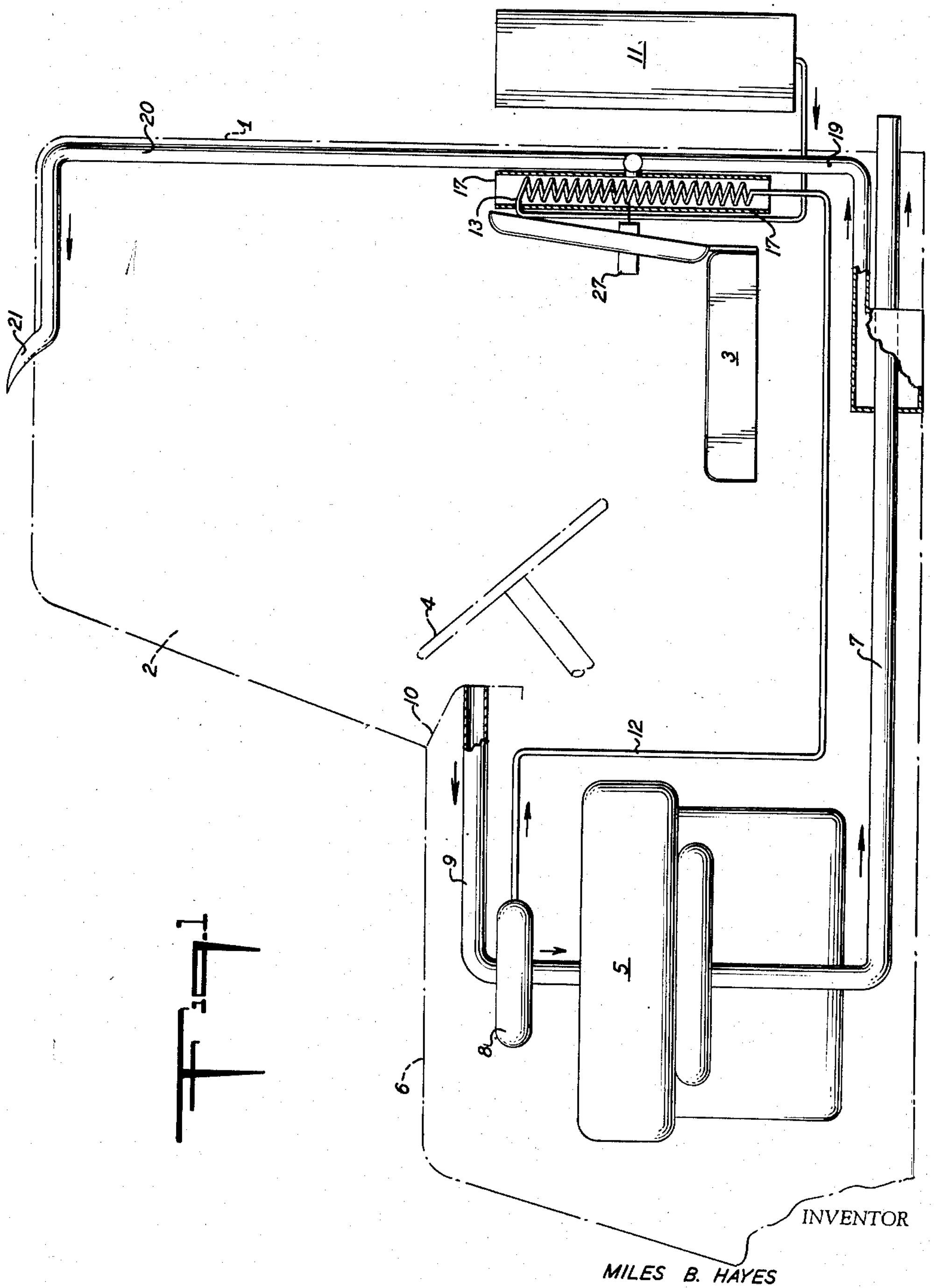
Fig 1 is a diagrammatic view showing a liquefied petroleum gas fuel supply system for a motor vehicle, with the invention applied thereto.

The invention may be used in connection with any liquefied petroleum gas engine, such, for example, as that used in a motor vehicle, i. e., a truck, automobile, or the like, which has an enclosed body or cab and employs liquefied petroleum gas as a fuel for the engine thereof.

The invention is illustrated as applied to a truck which has a cab enclosing the operating compartment, as an example of a vehicle to which this system is applicable.

The cab of the truck is illustrated diagrammatically at 1, enclosing an operator's compartment 2, within which a seat is provided, as indicated at 3, within convenient reach of a steering wheel 4.

The engine is illustrated generally at 5 and usually enclosed within a hood 6 that may be supported separately on the vehicle or as an integral part of the cab 2. The engine is provided with an exhaust pipe, shown generally at 7, and with a fuel supply system that includes a carburetor 8 to which air is supplied through a pipe 9 for mixing with fuel in the carburetor. The air supply pipe 9 is shown as extending in open communication with the interior of the operator's compartment 2, through any convenient wall thereof as, for example, through the dash 10 customarily provided.

Liquefied petroleum gas is supplied from a fuel tank 11 (Fig. 2) mounted at a suitable point on the vehicle and adapted to be filled with any desired type of such fuel, propane, butane, or a mixture thereof, which liquefied gas is adapted to be vaporized and to be supplied to the carburetor 8 of the engine. The fuel supply system is shown somewhat more in detail in Fig. 2, although any suitable form of system adapted for effecting the supply of gas under proper pressure conditions to the carburetor, may be used as desired.

The fuel supply line is indicated generally at 12 and includes the conventional elements, such as a heat exchanger 13, first and second-stage pressure regulators 14 and 15, and may have a pressure cut-off switch 16. These elements function in the usual manner to effect a suitable reduction of pressure of the liquefied fuel, and by reason of such pressure reduction and the heat exchange that occurs at 13, the fuel is vaporized and supplied to the carburetor in proper condition for use and combustion in the engine.

The first-stage regulator 14 should be mounted as close to the expansion coil 13 as possible, to avoid the admission of vaporized fuel into the line between the regulator and the expansion coil. It would also keep a constant flow of liquid to the expansion coil at all times and prevent the line from vaporizing the fuel between the regulator and the coil.

The heat exchanger 13 is located inside the operator's compartment 2, preferably behind the operator's seat 3, as illustrated in Fig. 1, and may be at least partly enclosed behind a shield or within a shell, generally indicated at 17, for directing the circulation of air through the operator's compartment 2 within the cab 1, to effect a conditioned atmosphere therein. Provision is made for supplying air to the heat exchanger 13, either from the outside atmosphere or from a source of air that is heated by the operation of the engine.

In this embodiment of the invention, the source of heated air includes a shell 18 mounted on, and in heat exchange relation with, the exhaust line 7 leading from the engine, and having a suitable opening for the admission of air thereto. Connected with the shell 18 is a hot air pipe 19 which extends into alignment with, and may be joined to, a fresh air inlet pipe 20. The pipe 20 extends to a point externally of the cab 1 and has an open outer end which may be provided, if desired, with a suitable air scoop 21, as shown in Fig. 1.

Intermediate the air pipes 19 and 20 is a suitable control valve assembly, an example of which is shown more in detail in Fig. 3. This assembly comprises a pair of vane-type valves 22 and 23, rotatably mounted by cross shafts 24 suitably journaled at the adjacent ends of the air pipes 19 and 20. The valves 22 and 23 are arranged on the shafts 24 so as to be alternately opened and closed. Thus, the valve 22 is open when the valve 23 is closed, and vice versa. When either of the valves 22 or 23 is open, air will be admitted from the corresponding pipe 19 or 20 to the heat exchanger 13 at or through the shell 17, if one be provided, or through a corresponding opening at the adjacent ends of the pipes 19 and 20.

The valves 22 and 23 are fixed on the shafts 24, and these shafts are connected together through a link 25 having eccentric connections 30 at its opposite ends with disks 31 on the shafts, so they will move together and to the same extent. An arm 26 is attached to one of the shafts 24, moving the valves 22 and 23 to their respective open and closed positions. It is preferred that the valves move through 90° and a corresponding movement of the arm 26 may be provided to accomplish the movement of the valves.

The valves may be operated either automatically or manually, as illustrated, respectively, in Figs. 3 and 4. In Fig. 3 is illustrated a thermostat 27 connected with the arm 26 and responding to the temperature of the operator's compartment 2, of the vehicle so as to move the valves 22 and 23 to an extreme position, according to the temperature provided in such compartment.

The valves can be moved in both directions by the thermostat 27, or the latter can operate in one direction and a spring or springs be used to return the valves to the opposite positions. Spring means may be connected either with the pull rod or with the valve shafts for this purpose.

The thermostat 27 will be located between the carburetor intake 9 and the expansion coil 13 on any installation. This thermostat 27 should be a variable type so as to maintain carburetor air temperature at or near 70° F., i. e., radiant heat is to be pulled across the expansion coil until the carburetor intake air is heated to about 70°. At this point, the thermostat closes the radiant heat valve 22 and opens the outside air valve 23 to let the cooler air pass over the expansion coil. As this air cools below 70°, the thermostat will then open the radiant heat valve 22 and close the outside air valve 23. This means that this valve 22—23 can open and close several times during an operation, especially during a 24-hour period, depending upon the climatic conditions involved.

The valves may be moved, if desired, by a flexible cable, indicated at 28 in Fig. 4, extending to the arm 26 from a suitable handle 29 mounted on the dash 10. Thus, upon grasping the handle 29, the operator may pull upon the cable 28 to swing the arm 26 so as to move the valves 22 and 23 to the alternate positions.

The respective valves 22 and 23 extend 90° with respect to each other on shafts 24. The end of the air pipe 19 or 20 is closed off thereby, and the other is open. The opening in the adjacent ends of the air pipes 19 and 20 is indicated at 32. If the air pipes are formed substantially integral at their adjacent ends, this opening may be provided as a notch cut therein for discharge of the air therethrough to the heat exchanger.

The operation of the system will be apparent from the foregoing description. The fuel system functions in the usual manner of a liquefied petroleum gas system, as described above. The heat exchanger, combined with the pressure regulators, will effect a reduction in pressure and vaporization of the liquefied petroleum gas, which will be supplied as gaseous fuel to the carburetor 8.

When the outside atmosphere has a very low temperature, this will act on the thermostat 27 to move the valves 22 and 23 so as to supply warm air through the pipe 19 from the heater 18 to the heat exchanger 13, sufficient to effect vaporization of the fuel and to maintain a uniform temperature in the operator's compartment 2. This air will continue to pass across the operator's compartment and into the open end of the air supply pipe 9 leading to the carburetor 8, thus providing a temperature of air supply which will provide proper carburetion of fuel.

On the other hand, when the outside atmosphere is warm, the temperature thereof will act on the thermostat 27 to effect movement of the valves, so as to open the valve 23 and to close the valve 22. In that event outside air will be drawn in through the air pipe 20 while communication from the pipe 19 will be cut off. This air will pass to the heat exchanger 13, through the operator's compartment 2 and the pipe 9 to the carburetor 8. It will be apparent, as noted above, that the valves may be shifted manually, as indicated in Fig. 4, rather than thermostatically, if preferred.

In this way, the system provides for year around operation under uniform temperature conditions, both in the compartment 2 and in the carburetor 8. Fresh air and regulated fuel are supplied to the carburetor to effect uniform operation of the engine, and a refrigerated atmosphere is also provided in the compartment 2 during warm weather to maintain a comfortable condition for the operator. Heat is consumed in it, forming the liquefied fuel into a gas in the heat exchanger 13. This heat consumption lowers the temperature in the cab, and thereby serves the dual purpose of providing comfort for the operator, while lowering the temperature of the engine air intake. This lower intake air temperature results in increased engine efficiency. During winter operation, the temperature of the air passing through the air pipe 19 is sufficiently high so as not only to effect vaporization of the liquefied fuel in the heat exchanger 13, but also to effect a sufficient warming of the interior of the cab and thus maintain a uniform temperature therein. In this way, uniform air conditioning is maintained the year around for the comfort of the operator and for the optimum temperature conditions of the engine.

While the invention has been illustrated and described in certain embodiments, it is recognized that other variations and changes may be made therein without departing from the invention as set forth in the claims.

I claim:

1. In a motor vehicle having an engine, a carburetor connected therewith and an operator's compartment, the combination of an air pipe extending from the carburetor into open communication with the operator's compartment, a source of liquefied petroleum gas, conduit means connecting said source of liquefied petroleum gas with the carburetor, a heat exchanger in the operator's compartment in open communication with said connecting conduit means for effecting vaporization of the liquefied petroleum gas, outside air intake supply pipes having discharge opening means in the direction of and adjacent the heat exchanger in the operator's compartment, means for supplying heat to one of said intake air pipes, and valve means for controlling the discharge of air from said pipes through the opening onto the heat exchanger.

2. In a motor vehicle having an engine, fuel supply means connected therewith and an operator's compartment, the combination of an air conduit having an open end in communication with the operator's compartment extending to said fuel supply means, a source of liquefied petroleum gas, open conduit means connecting said source of liquefied petroleum gas with said fuel supply means, a heat exchanger in the operator's compartment included in said open connecting conduit means for effecting vaporization of the liquefied petroleum gas, outside air intake supply conduits having discharge opening means in the direction of and adjacent the heat exchanger in the operator's compartment, means for supplying heat to one of said air intake conduits, and valve means for controlling the discharge of air from said air intake conduits through the opening means onto the heat exchanger.

3. In a motor vehicle having an engine, a fuel supply means connected therewith and an operator's compartment, the combination of an air conduit having an open end in communication with the operator's compartment extending to said fuel supply means, a source of liquefied petroleum gas, open conduit means connecting said source of liquefied petroleum gas with said fuel supply means, a heat exchanger in the operator's compartment included in said open connecting conduit means for effecting vaporization of the liquefied petroleum gas, outside air intake supply conduits having discharge opening means in the direction of and adjacent the heat exchanger in the operator's compartment, means for supplying heat to one of said air intake conduits, the other air intake conduit extending out of the operator's compartment and having an air scoop thereon, and valve means for controlling the discharge of air from said air intake conduits through the opening means onto the heat exchanger.

4. In a motor vehicle having an engine, a fuel supply means connected therewith and an operator's compartment, the combination of an air conduit having an open end in communication with the operator's compartment extending to said fuel supply means, a source of liquefied petroleum gas, open conduit means connecting said source of liquified petroleum gas with said fuel supply means, a heat exchanger in the operator's compartment included in said open connecting conduit means for effecting vaporization of the liquefied petroleum gas, outside air intake supply conduits having discharge opening means in the direction of and adjacent the heat exchanger in the operator's compartment, means for supplying heat to one of said air intake conduits, the other air intake conduit extending out of the operator's compartment and having an air scoop thereon, valve means for controlling the discharge of air from said air intake conduits through the opening means onto the heat exchanger, and thermostatic means in the compartment adjacent the open end of said first-mentioned air conduit extending to the fuel supply means for controlling said valve means.

References Cited in the file of this patent

UNITED STATES PATENTS

| | | |
|---|---|---|
| 1,774,352 | Bull | Aug. 26, 1930 |
| 1,826,471 | James | Oct. 6, 1931 |
| 2,286,803 | Holthouse | June 16, 1942 |
| 2,701,133 | Mendez | Feb. 1, 1955 |